United States Patent
Luo et al.

(10) Patent No.: US 10,922,891 B2
(45) Date of Patent: Feb. 16, 2021

(54) METHOD FOR GENERATING AN AUGMENTED REPRESENTATION OF A REAL ENVIRONMENT, CORRESPONDING DEVICE, COMPUTER PROGRAM PRODUCT, AND COMPUTER-READABLE CARRIER MEDIUM

(71) Applicant: INTERDIGITAL CE PATENT HOLDINGS, Paris (FR)

(72) Inventors: Tao Luo, Beijing (CN); Philippe Robert, Rennes (FR); Anthony Laurent, Vignoc (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 27 days.

(21) Appl. No.: 16/352,333

(22) Filed: Mar. 13, 2019

(65) Prior Publication Data
US 2019/0287308 A1 Sep. 19, 2019

(30) Foreign Application Priority Data
Mar. 13, 2018 (EP) .................................. 18305267

(51) Int. Cl.
*G06T 19/00* (2011.01)
*G02B 27/01* (2006.01)
*G06F 3/01* (2006.01)
*G06F 3/0481* (2013.01)

(52) U.S. Cl.
CPC .......... *G06T 19/006* (2013.01); *G02B 27/017* (2013.01); *G06F 3/011* (2013.01); *G06F 3/012* (2013.01); *G06F 3/04815* (2013.01); *G02B 2027/014* (2013.01); *G02B 2027/0138* (2013.01); *G06T 2200/04* (2013.01)

(58) Field of Classification Search
None
See application file for complete search history.

(56) References Cited

U.S. PATENT DOCUMENTS

| 9,454,849 B2 | 9/2016 | Mount et al. |
| 2016/0025982 A1 | 1/2016 | Sutherland et al. |
| 2016/0027212 A1 | 1/2016 | Da Veiga et al. |

(Continued)

FOREIGN PATENT DOCUMENTS

WO WO2013052855 4/2013

*Primary Examiner* — Yanna Wu
(74) *Attorney, Agent, or Firm* — Invention Mine LLC

(57) ABSTRACT

The disclosure relates to a method for generating an augmented representation of a real environment, called an augmented reality representation. Such a method includes obtaining, as a function of said real environment, a virtual boundary dividing the real environment into two spaces, respectively called an activity space and a mixed space. The augmented reality representation is generated by obtaining a first part of the augmented reality representation, called an activity part, corresponding to a representation of at least one part of the activity space. Thereafter, obtaining a second part of the augmented reality representation, called a mixed part, corresponding to an augmented representation of at least one part of the mixed space, in which at least one virtual content is combined with the representation of at least one part of the mixed space.

21 Claims, 5 Drawing Sheets

(56) References Cited

U.S. PATENT DOCUMENTS

2016/0027215 A1* 1/2016 Burns ................... G06F 3/011
  345/419
2016/0171771 A1* 6/2016 Pedrotti .............. G02B 27/017
  345/633

* cited by examiner

METHOD FOR GENERATING AN AUGMENTED REPRESENTATION OF A REAL ENVIRONMENT, CORRESPONDING DEVICE, COMPUTER PROGRAM PRODUCT, AND COMPUTER-READABLE CARRIER MEDIUM

REFERENCE TO RELATED EUROPEAN APPLICATION

This application claims priority from European Patent Application No. 18305267.9, entitled "METHOD FOR GENERATING AN AUGMENTED REPRESENTATION OF A REAL ENVIRONMENT, CORRESPONDING DEVICE, COMPUTER PROGRAM PRODUCT, AND COMPUTER-READABLE CARRIER MEDIUM", filed on Mar. 13, 2018, the contents of which are hereby incorporated by reference in its entirety.

FIELD OF THE DISCLOSURE

The present disclosure relates to the field of augmented reality applications. More particularly, the present disclosure relates to a technique for generating an augmented representation of a real environment.

BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In augmented reality applications taking place in an uncontrolled complex real-world environment, for inserting virtual objects in mixed reality in a user's living room, it is recommended to understand and analyse the layout of the real scene, but also its radiometry, the geometry and appearance of the virtual objects, the user position, and the purpose of the application itself.

In an augmented reality representation provided to the user, it may happen that a virtual content obscures a real-world object close to the user in the real world environment. To overcome this problem, the approach generally adopted by prior art solutions consists in modifying in real-time the display of a virtual content, when it is detected that this virtual content is likely to obscure the view of the user. In that way, the user can see nearby real-world objects and avoid collision when he moves around. For example, in document US 2016/0027212 A1, data captured by sensors embedded on a head-mounted display worn by a user are used to compute in real-time distances between the user and nearby real-world objects. If a distance between the user and a real-world object becomes lower than a predetermined threshold when the user moves around in the real-world environment, any virtual content overlaid on this real-world object is dimmed or faded out, thus allowing the user to become aware of the presence of this object. As an alternative, a problematic virtual content may also be reduced in size, moved elsewhere in the augmented reality representation, or even removed from the augmented reality representation, as described for example in document WO 2013/052855 A2.

Although effective for ensuring the safety of the user, these solutions of prior art make the mixed scenario less realistic, and compromise the quality of the user experience. Indeed, the proposed solutions relying on modifying in real-time a problematic virtual content (by dimming it, fading it out or reducing its size for example) cannot satisfy the goal of consistent perception of both virtual content and real scene. In addition, such a real-time adjusting of virtual content also requires important computing power, which may monopolize a significant part of the resources of the processor in charge of generating the augmented reality representation.

It would hence be desirable to provide a technique for generating an augmented representation of a real environment that would avoid at least one drawback of the prior art.

SUMMARY

The present disclosure pertains to a method for generating an augmented representation of a real environment, called an augmented reality representation. The real environment comprises at least one real object. Such a method comprises:
  obtaining, as a function of data associated with objects of the real environment, a virtual boundary dividing said real environment into two spaces, respectively called an activity space and a mixed space;
  generating said augmented reality representation, comprising:
    obtaining a first part of said augmented reality representation, called an activity part, corresponding to a representation of at least one part of said activity space; The activity part is free of virtual content;
    obtaining a second part of said augmented reality representation, called a mixed part, corresponding to an augmented representation of at least one part of said mixed space, in which at least one virtual content is combined with said representation of at least one part of said mixed space.

According to the proposed technique, the augmented reality representation is thus divided in two parts: a first part corresponding to a non-augmented representation of the real environment, and a second part corresponding to an augmented representation of the real environment. In that way, a user (who wears a head-mounted device for example) can moves safely within the activity space in the real environment, since the corresponding activity part of the augmented reality representation is free of virtual content (therefore, there is no risk that a user moving within the activity space bumps into or trip over real-world object because of a virtual object obscuring his view in the augmented reality representation). In addition, the quality of the user experience is better than with the existing techniques since the user can move freely in the activity space with no additional need to dim or fade out the display of virtual content to make the user see nearby real-world object: the mixed scenario thus stays realistic, with a permanent and consistent perception of both virtual and real content. The computing power required in previous art solutions to compute real-time distances between the user and real-world objects, and to dim or fade out virtual objects overlaid on them when the user gets too close, is also saved with the proposed technique.

BRIEF DESCRIPTION OF THE DRAWINGS

Embodiments of the present disclosure can be better understood with reference to the following description and drawings, given by way of example and not limiting the scope of protection, and in which.

Figure 1:
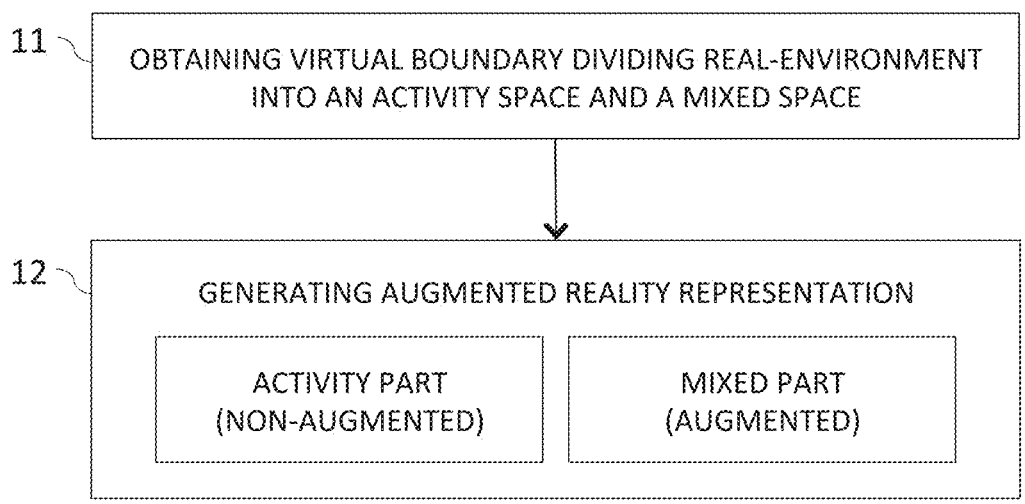
FIG. 1 is a flow chart for illustrating the general principle of the proposed technique for generating an augmented representation of a real environment, according to an embodiment of the present disclosure.

The components in the figures are not necessarily to scale, emphasis instead being placed upon illustrating the principles of the disclosure.

DETAILED DESCRIPTION

General Principle

The general principle of the present disclosure relies on a specific technique for generating an augmented representation of a real environment, also referred to as augmented reality representation throughout the document. Such an augmented reality representation is provided to a user by means of a rendering device such as for example a head-mounted display, a mobile phone (smartphone), or a tablet.

As it will be described more fully hereafter with reference to the accompanying figures, it is proposed in one aspect of the present disclosure to virtually divide the real environment into two distinct spaces: one space which may be assimilated as a safety zone within which a user can move around safely while viewing an augmented representation of the real environment, and another space specifically defined as the usable space for the insertion of the virtual content in the generated augmented reality representation.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the scope of the disclosure as defined by the claims. For example, the term "obtain" used with respect to a given characteristic throughout the disclosure (such as obtaining a virtual boundary, an activity part, a mixed part, etc.) is to be understood as encompassing both the situations where this characteristic is determined by the device implementing the proposed technique itself, or received from an external device. In the drawings, alike or similar elements are designated with identical reference signs throughout the several views thereof.

While not explicitly described, the present embodiments and variants may be employed in any combination or sub-combination.

FIG. 1 is a flow chart for explaining the method for generating an augmented representation of a real environment, according to the general principle of the present disclosure.

At step 11, a virtual boundary dividing the real environment into two spaces, respectively called an activity space and a mixed space, is obtained.

At step 12, an augmented representation of the real environment (called an augmented reality representation) is generated, as a function of the virtual division previously obtained at step 11. More particularly, generating the augmented reality representation comprises:

obtaining a first part of said augmented reality representation, called an activity part, corresponding to a representation of at least one part of said activity space;

obtaining a second part of said augmented reality representation, called a mixed part, corresponding to an augmented representation of at least one part of said mixed space, in which at least one virtual content is combined with said representation of at least one part of said mixed space.

Figure 2:
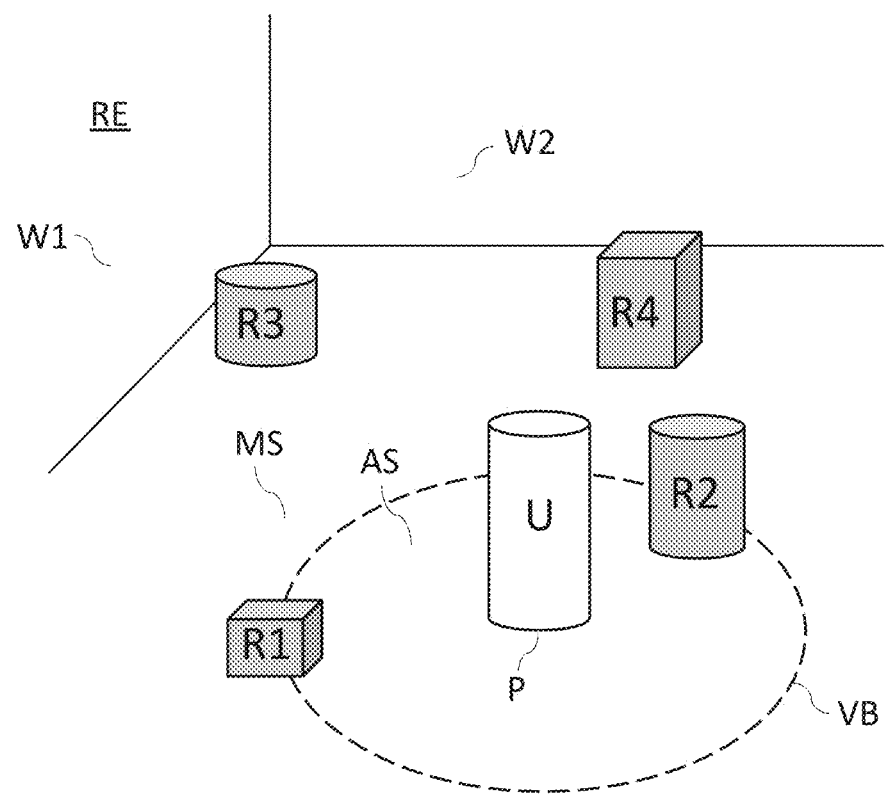
FIG. 2 shows an example of the division of a real environment into an activity space and a mixed space according to an embodiment of the present disclosure.
Figure 3:
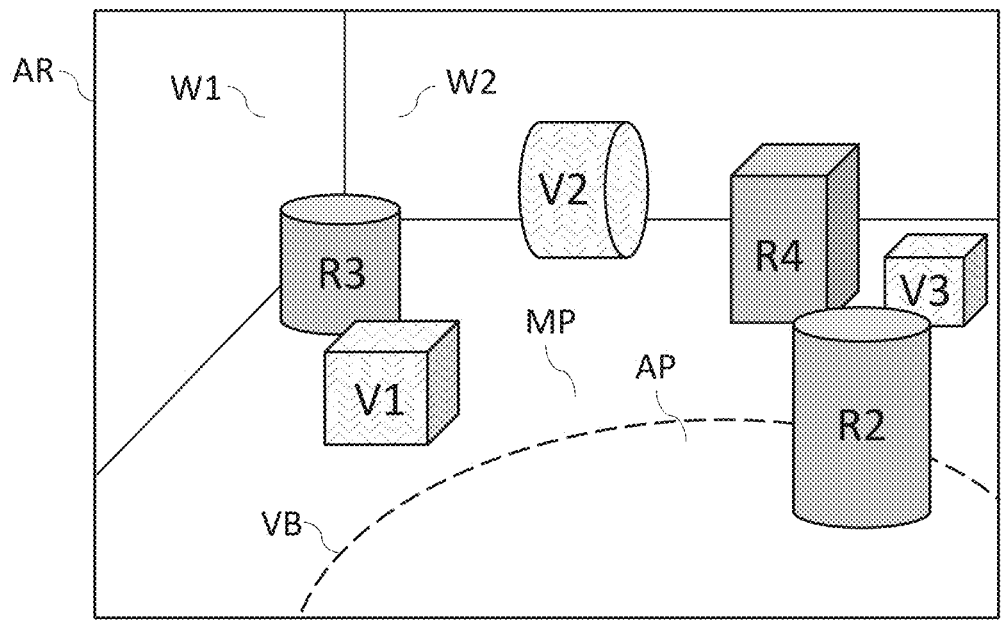
FIG. 3 shows an example of an augmented reality representation of the real environment introduced in FIG. 2, according to an embodiment.

FIGS. 2 and 3 illustrate, with an example, the effect of carrying out the proposed technique for generating an augmented representation AR of a real environment RE.

In this example, the real environment RE comprises four objects (R1, R2, R3 and R4) lying on the ground, in a corner of a room formed by two walls W1 and W2, as illustrated on FIG. 2 in a perspective view. Although represented by simple shapes on FIG. 2, R1, R2, R3 and R4 are real-world objects (such as, for example chairs, table, etc.). In the context of the disclosure, the term "object" must be understood in a broad sense: an object may refer to a static or mobile object, and a person (other than the user viewing the augmented representation) is for example considered as an object. A user U, for whom the augmented reality representation is intended, stands within this real environment RE, for example at a position P. The user U is equipped with a device allowing him to view the augmented reality representation. For example, he wears a head-mounted display or special glasses on which the augmented reality representation is rendered, or he holds a mobile phone or a tablet on the screen of which the augmented reality representation is displayed.

As explained in relation with step 11 of FIG. 1, a virtual boundary VB divides the real environment into two separated spaces respectively called an activity space AS and a mixed space MS. Although represented by a simple two-dimensional dotted line projected on the ground in FIG. 1, the virtual boundary VB may actually take the form of a three-dimensional surface dividing the three-dimensional space of the real environment, such as for example the surface of a half sphere, or of a cylinder (virtually extending from floor to ceiling for example, in case of an indoor environment). The way that the virtual boundary VB is obtained will be described later in the document.

FIG. 3 shows an example of an augmented reality representation AR generated according to the proposed technique, and provided to the user (rendered for example in real-time on a head mounted display worn by the user). In this example, the augmented reality representation AR corresponds to a representation of the real environment RE as it may be seen by a user standing at the position P shown in FIG. 2 and facing the wall W2. As it may be noticed on FIG. 3, this representation is an "augmented representation" since three virtual objects V1, V2 and V3 (which are not real-world objects, and which thus do not exist in the real environment RE) have been added to the generated AR representation. In other words, a virtual scene comprising the virtual objects V1, V2 and V3 has been mixed with the real scene, to form the augmented reality representation AR. According to the proposed technique, and as described in relation with step 12 of FIG. 1, the virtual scene is inserted in a mixed part MP of the augmented reality representation AR, corresponding to an augmented representation of at least one part of the mixed space MS of the real environment RE. Conversely, no virtual object is inserted in an activity part AP of the augmented reality representation AR, corresponding to a representation of at least one part of the activity space AS of the real environment RE (the activity part AP thus corresponds to a non-augmented representation part).

As a result, the activity space AS can be considered as a safety zone within which the user can move around freely and safely while viewing the augmented representation of the real environment, without risk of bumping into or tripping over real-world object because of a virtual object obscuring his view. For example, referring back to FIG. 2, as long as user U is located in the activity space AS, real-world object R2 within the activity space AS will not be hidden to the user's sight because of a virtual object obscuring his view in the augmented reality representation, since the proposed technique prevents such a virtual object to be displayed within the corresponding activity part AP of the augmented reality representation.

When compared with existing solutions described in prior art, the proposed technique provides an enhanced user experience. Indeed, the user can move freely in the activity space, with no additional need to modify in real-time the display of some virtual contents (for example by dimming them or fading them out) to make the user see nearby real-world object. The mixed scenario (the aim of which is usually to blend seamlessly together virtual and real objects) thus stays realistic, with a permanent and consistent perception of both virtual and real content. In addition, the computing power required in prior art solutions to compute in real-time such modifications of the display of virtual contents is also saved, and may be reallocated to further improve the quality of the augmented reality experience. Finally, because the space dedicated to the user (i.e. the activity space) and the space usable for the insertion of the virtual scene (i.e. the mixed space) are clearly distinct spaces, the generated augmented representation is less exposed to undesirable graphic artefacts, due to poorly modelled interactions between virtual content and human, that sometimes appear in augmented representation generated by prior art solutions when a user breaks into the field of virtual events. The user experience is thus even more enhanced with the proposed technique.

DESCRIPTION OF VARIOUS EMBODIMENTS

General Overview

Figure 4:
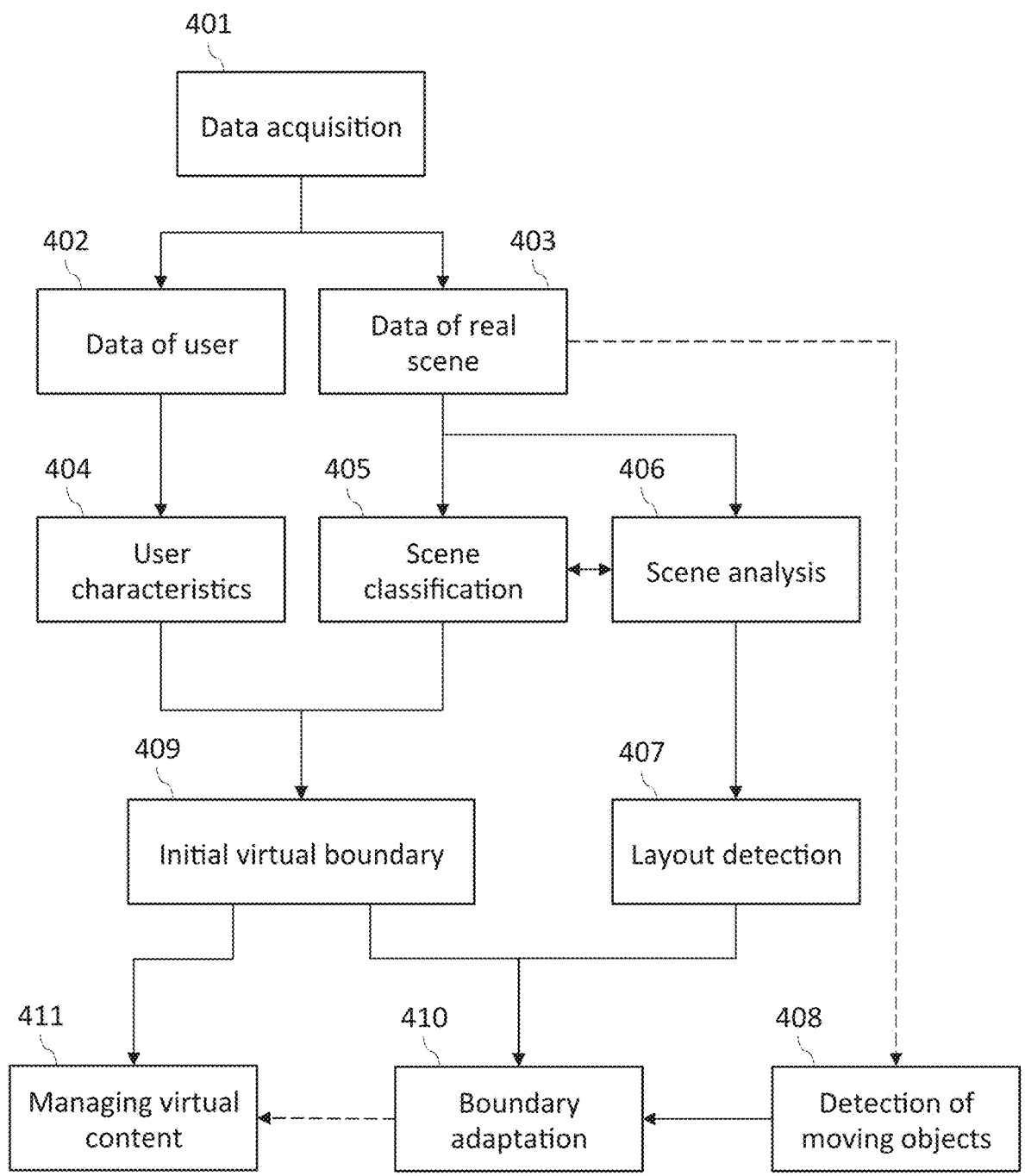
FIG. 4 is a schematic block diagram illustrating how the proposed technique may be implemented, according to an embodiment of the present disclosure.

FIG. 4 is a schematic functional block diagram illustrating how the virtual boundary dividing the real environment into an activity space and a mixed space may be obtained, and how the augmented reality representation may then be generated, according to different embodiments of the disclosure.

Various data are first acquired (401) by various sensors, such as localizing sensors (e.g. Global Positioning Systems such as GPS or equivalent, Inertial Measurement Unit including gyroscope and accelerometers), cameras (e.g. color and/or depth cameras), microphones, etc. These sensors are preferentially embedded directly on a device for generating and rendering the augmented reality representation, but other sensors arranged in the real environment may also optionally be used (in this case, the data acquired by these other sensors are obtained by the device for generating the augmented representation through communication means).

The acquired data are classified into two main categories: data associated with the user (402), and data associated with the real scene (403) (the real scene being the part of the real environment currently analysed).

Data associated with the user (402) include but are not limited to the position and orientation of the user within the real environment. These data may be processed (alone or by cross-analysis, in combination with data associated with the real scene) to deliver user characteristics (404), such as user's height or user's current posture (lying, seated, standing posture).

Data associated with the real scene (403) include but are not limited to data acquired by color and depth cameras, which allow performing three-dimensional reconstruction of the real scene in real-time (alternatively, a previously determined 3D reconstruction of the real scene may be imported directly). These data associated with the real scene are processed to perform scene classification (405) and scene analysis (406).

The scene classification (405) allows determining a category of real scene. For example, the real scene may be classified as an indoor or as an outdoor scene. The real scene may also be classified in a more detailed manner, for example as a living room scene, a bedroom scene, and so on, in case of an indoor scene.

The scene analysis (406) is carried out by means of various existing image processing techniques, including image segmentation techniques and recognition techniques, and allows the detection of a layout representation of the real scene (407). For example, considering an indoor scene, the layout representation may comprise the ground floor, the bounding walls, the ceiling, and the segmented static objects. Considering an outdoor scene, the layout representation may be limited to the ground floor and segmented static objects.

The data associated with the real scene (403), which are acquired periodically, also allow the detection of moving objects within the real scene (408).

All the functional blocks previously described (401 to 408) pertain to common image processing techniques that may be implemented in prior art solutions for generating augmented reality representation of a real environment.

However, according to the present disclosure, the information obtained as an output of these functional blocks are used in relation with three new functional blocks for implementing the general principle of the proposed technique. Two of these blocks (obtaining initial virtual boundary (409) and boundary adaptation (410)) pertain to obtaining a virtual boundary (as described in relation with step 11 of FIG. 1), while the third one (managing virtual content (411)) pertains to the generation of the augmented reality representation as a function of the virtual boundary previously obtained (as described in relation with step 12 of FIG. 1).

The way these functions are implemented in different embodiments of the proposed technique is detailed hereinafter.

Obtaining Initial Virtual Boundary, and Boundary Adaptation

Obtaining the virtual boundary dividing the real environment into an activity space and a mixed space is an aspect of the present disclosure.

According to an embodiment, the real environment comprises at least one real object and obtaining said virtual boundary comprises obtaining at least part of said virtual boundary as a function of said at least one real object.

In particular, according to an embodiment, said virtual boundary is obtained as a function of a shape of said at least one real object.

In that way, the virtual boundary can be adapted so that a real object belongs totally to one of said activity space or mixed space.

In one embodiment, said at least one real object is a moving object, and said at least part of said virtual boundary is obtained dynamically, as a function of said at least one moving real object.

In that way, the virtual boundary can be adapted to take account of a moving object.

In one embodiment, obtaining said virtual boundary comprises obtaining at least part of said virtual boundary as a function of a category of said real environment.

In that way, the virtual boundary can more particularly be adapted depending on whether said real environment corresponds to an indoor environment or an outdoor environment.

According to an embodiment, obtaining said virtual boundary comprises obtaining at least part of said virtual boundary as a function of a scale difference between said real environment and a default virtual scene comprising said at least one virtual content.

In that way, a piece of data representative of a size of a default virtual scene may be compared to a dimension with respect to the real environment to adapt the virtual boundary.

In another embodiment, obtaining said virtual boundary comprises obtaining at least part of said virtual boundary as a function of an initial position of a user of the augmented reality representation within said real environment.

Thus, the initial position of the user within the real environment is taken into account, in addition to the real environment itself, to obtain the virtual boundary. In that way, an initial neighbourhood of this initial position may be included in the activity space.

In that way, the user may also be invited to move if the system considers that the current location will not provide an augmented reality experience of sufficient quality. Such a situation may happen, for example, if the user's initial position is too close to a bounding wall of the real environment, which would constraint too much the activity space available to the user, and lead to a degraded user's experience.

According to an embodiment, obtaining said virtual boundary comprises obtaining at least part of said virtual boundary as a function of a current height and/or a current posture of the user of the augmented reality representation.

In that way, the virtual boundary may be obtained, for example, depending on whether the user is standing, seated or lying. Indeed, a seated user may not need as much as activity space as a standing user. More mixed space may then be dedicated to augmented representation for a seated user than for a standing user, for example.

The previously introduced embodiments regarding obtaining the virtual boundary are now further detailed.

The determination of the virtual boundary dividing the real environment into an activity space and a mixed space is performed as a function of the real environment, and may be carried out in two phases: a first phase for obtaining an initial virtual boundary, and a second phase for refining or adapting the previously obtained initial virtual boundary.

Figure 5:
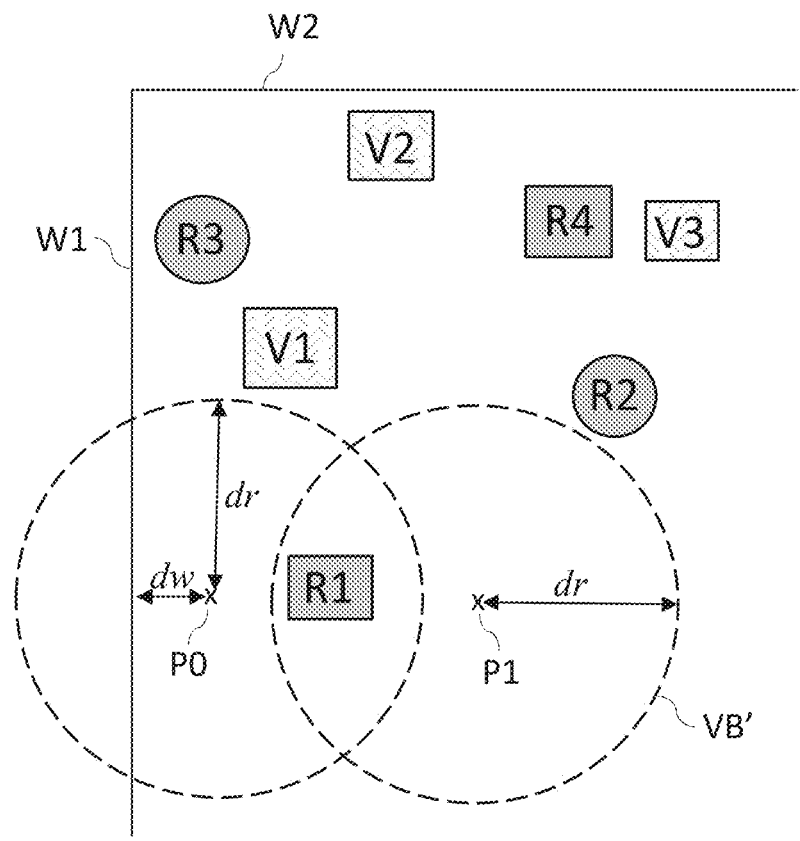
FIG. 5 illustrates how an initial position of the user may be taken into account to obtain a virtual boundary, according to an embodiment of the present disclosure.
Figure 6:
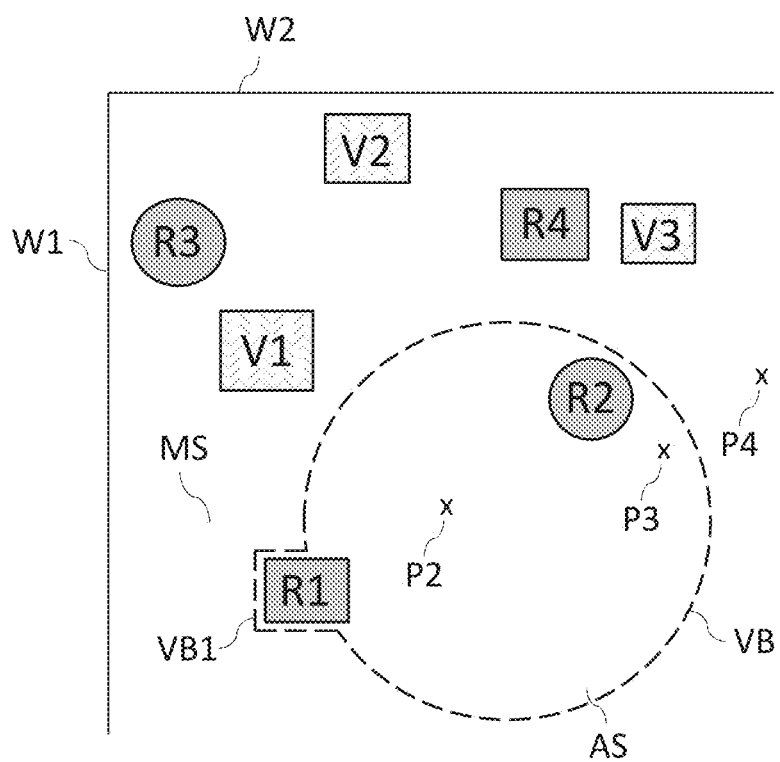
FIG. 6 depicts an example of a virtual boundary adapted to encompass a given real object, according to an embodiment of the present disclosure.

During the first phase, according to one embodiment, the initial virtual boundary is obtained by using a distance parameter as a space division parameter. Such an embodiment is described in relation with FIGS. 5 and 6, showing a top view of the real environment RE of FIG. 2, in which virtual objects V1, V2 and V3 have been virtually added. As illustrated in FIG. 5, a distance parameter dr is used as a radius to generate the initial virtual boundary surface VB' from a reference position P1 within the real environment. Again, for purpose of simplification, only the projection of the virtual boundary on the ground is shown on the figure (circle in dotted line), but the virtual boundary preferably takes the form of a three-dimensional surface, such as for example the surface of a half sphere, or of a cylinder. According to a particular feature, the distance parameter dr (and thus the virtual boundary VB') is for example obtained as a function of a category of the real scene, as obtained as an output of a scene classification module such as block 405 previously described in relation with FIG. 4. More particularly, the distance parameter dr is determined depending on whether the real scene is an outdoor or an indoor scene. Indeed, in an outdoor scene, there is usually more available space than in an indoor scene, and a larger activity space may be allocated for a user to move around and experience the augmented reality representation. For example, the distance parameter dr may be set to one meter in an indoor real environment, and to three meters in an outdoor real environment. User may also further tune the distance parameter dr manually.

Determining the distance parameter dr, and thus the initial virtual boundary VB' may also take account of various users' characteristics. Thus, according to an alternative or complementary feature, the height and/or the posture of the user may be considered when obtaining the initial virtual boundary. For example, a seated or lying user is less likely to move around than a standing user. Thus, the distance parameter dr may be set to a lower value for a seated or lying user than for a standing user. In a similar way, the distance parameter dr may be set as a function of the height of the user (for example to one time the height of the user in an indoor environment, and to two or three times the height of the user in an outdoor environment).

According to an embodiment, the reference position P1 from which the initial virtual boundary is obtained may be computed automatically as a function of the result of the analysis of the real scene, thanks to the data acquired by the various sensors placed in the augmented reality device and potentially in the real environment itself. In particular, this reference position may be determined as a position considered as appropriate for viewing a mixed scenario in good conditions, i.e. a position at least at distance dr from any significant real obstacle (such as walls W1 and W2) which could limit the effective size of the activity space.

Alternatively, in another embodiment, an initial position of the user within the real environment may be used as a reference position to obtain the initial virtual boundary. Once obtained, the virtual boundary is no more dependent on the position of the user (and the virtual boundary is kept when the user moves around). When the virtual boundary is obtained as a function of an initial position of the user, the user may be invited to move to a better position for obtaining the virtual boundary. For example, as illustrated in relation with FIG. 5, a user located at position P0 may be considered as too close from the bounding wall W1, since distance dw to the wall W1 is below the distance parameter dr. At position P0, the wall W1 would indeed limit the activity space available to the user, and the user experience could thus not be optimal. In such a case, according to a particular feature, some virtual cues (e.g. directional arrows) are displayed on the rendering device used to view the augmented representation, to advise the user to move further away from the wall W1 until the distance is large enough (i.e. above the distance parameter dr) for an optimal user experience.

During a second phase, according to an embodiment, the previously obtained initial virtual boundary is refined or adapted to take account of other characteristics of the real environment. More particularly, at least part of the virtual boundary may be obtained as a function of a real object present within the real environment. In that way, if a real object is located on the initial virtual boundary, the virtual boundary can be adapted so that said real object belongs totally to one of the activity space or mixed space. For example, in the situation illustrated in relation with FIG. 2, real-world object R1 is located on the virtual boundary VB, which could cause some problem when generating the augmented reality representation (in particular because some virtual object could be blended with the part of R1 remaining in the mixed space). As illustrated in relation with FIG. 6, at least a part VB1 of the virtual boundary VB is thus adapted as a function of the shape of real object R1, so that this object belongs totally to the activity space AS. An oriented bounding box of the segmented object R1, as obtained as an output of the layout detection module, can notably be employed to carry out the boundary adaptation (for example by using the projected edges of the bounding box on the ground). Other situations may require virtual boundary adaptation. More particularly, according to an embodiment, at least part of the virtual boundary is obtained dynamically, as a function of a moving real object. Such an embodiment is particularly interesting when considering outdoor environment, where dynamic objects such as pedestrians, cars, bicycles are likely to emerge in the scene at any time. Thus, according to a particular feature, the virtual boundary is adapted automatically to encompass dynamic (i.e. moving) objects that move across the boundary. In that case, the output of detection of dynamic objects is used in addition to the output of the layout detection module to carry out the boundary adaptation.

Augmented Reality Representation Generation

Once the virtual boundary dividing the real environment into an activity space and a mixed space has been obtained, the augmented reality representation can be generated. According to the present disclosure, generating the augmented representation implies managing the virtual content, so that the generated augmented reality representation complies with certain particular constraints, the main of which being that all the virtual content has to be added only within a given part of the representation; i.e. the mixed part associated with the mixed space of the real environment. This differs from the approach of conventional solutions, wherein the whole space in the field of view of the user is potentially usable for inserting some virtual objects.

According to an embodiment obtaining said mixed part of the augmented reality representation comprises scaling the at least one virtual content as a function of at least one size difference between a default virtual scene comprising said at least one virtual content and said real environment in said mixed space.

In that way, by comparing a default virtual scene with some characteristics of the real environment, the scale of the virtual content may be adapted to provide the best user's experience according to said given real environment.

According to a particular feature, said at least one virtual content is scaled as a function of a difference between a virtual ground area size of said default virtual scene and a real ground area size of said real environment in said mixed space.

According to an embodiment, at least one virtual content in said mixed part is determined by taking account of a representation of at least one real content in said activity part.

In that way, although activity and mixed part are dissociated parts, a virtual object in the mixed part may be rendered not only according to its occlusion with real object belonging to mixed part, but also according to its occlusion with real object belonging to the activity part.

According to another embodiment, the method for generating an augmented representation of a real environment further comprises alerting a user of the augmented reality representation when a distance between said user and the virtual boundary is lower than a predetermined threshold.

In that way, the user may be warned if he is about to cross the virtual boundary and leave the activity space. Some visual cues may for example be displayed to prompt him to stay in the activity space to enjoy the best user's experience. In the case the user moves across the boundary without respecting the warnings, the mixed-reality application (runtime application) could for example be paused until the user moves back to the activity space.

The previously introduced embodiments regarding generating the augmented reality representation are now further detailed.

Figure 7:
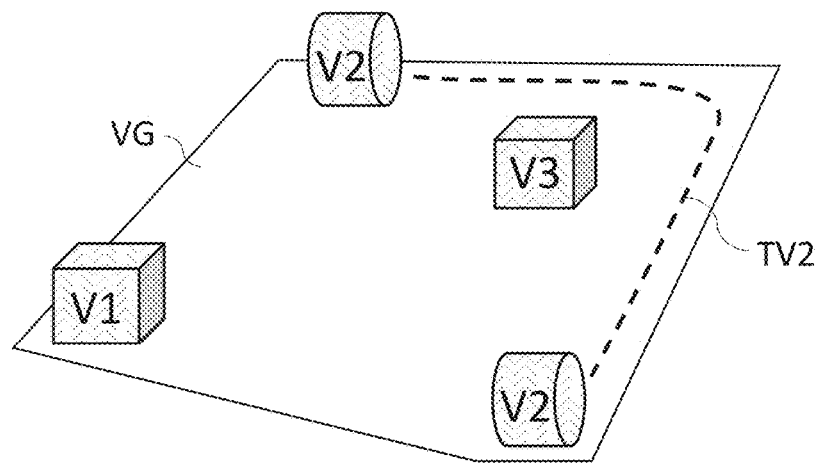
FIG. 7 shows how a virtual ground area size of a default virtual scene may be obtained, according to an embodiment of the present disclosure.

In one embodiment, the scale of the virtual objects is adapted as a function of the mixed space of the real environment. More particularly, a default virtual scene comprising the virtual objects to be displayed is compared with the mixed space. The comparison is made on the basis of a size difference such as, for example, a difference between a virtual ground area size of the default virtual scene and a real ground area size of the mixed space of the real environment. The real ground area size may be obtained as an output of real scene analysis or layout detection, as already described in relation with FIG. 4. The area size of the largest horizontal plane detected in the mixed space (other than a ceiling, e.g. the surface of the real ground or of a table) is for example considered as a reference scale for the mixed space. Depending on the augmented reality application, the virtual ground area may be explicitly configured in the application, or not. If the virtual ground area is configured in the augmented reality application, its size is directly available. If not, this size is estimated by projecting the virtual objects belonging to the default virtual scene and their trajectories on a horizontal plane, and by computing the size of the convex hull encompassing the projected elements. An example of such a case is illustrated in relation with FIG. 7. The virtual scene comprises two statics virtual objects V1 and V3, and a moving virtual object V2. The area size of the convex hull VG encompassing virtual objects V1 and V3, initial and final positions of virtual object V2, and the trajectory TV2 of V2 between these initial and final positions, is used as a reference scale for the default virtual scene.

Depending on the ratio between the reference scale for the default virtual scene and the reference scale for the mixed space, the default virtual scene is scaled down, scaled up, or not scaled. According to a particular feature, the default virtual scene is scaled (if necessary) so that the ratio between the scaled virtual scene and the reference scale for the mixed space is comprised between one third and two-thirds (meaning that the area size of the scaled virtual ground is larger than one third of the area size of the considered real ground of the mixed space, and smaller than two-thirds of said area size of the considered real ground of the mixed space). Such a ratio is indeed considered as an appropriate ratio which allows, in most cases, a realistic insertion of the virtual scene within the real scene.

Of course, managing the virtual content is not limited to scaling the virtual scene, but also includes for example obtaining the optimal location for the virtual objects according to the layout of the real scene and identified objects in the mixed space, and adjusting the virtual events accordingly (i.e. managing interaction between virtual objects and specific real objects of the mixed space). It should also be noted that although the configuration (i.e. scale, location, interaction) of virtual content only depends on the real objects present in mixed space, the rendering of virtual content should however, under certain circumstances, be determined as a function of a representation of at least one real content in the activity part. For example, referring back to the augmented reality representation AR of FIG. 3, virtual object V3 is partially obscured by real object R2, to keep the augmented reality representation realistic. In other words, virtual objects are to be rendered in the mixed part according to their occlusion with real and other virtual objects present in the mixed part, but also according to their occlusion with real objects present in the activity part.

As explained throughout the document, the disclosure relies on the virtual division of the real environment into two distinct spaces: the activity space assimilated as a safety zone within which a user can move around safely while viewing an augmented representation of the real environment, and the mixed space more specifically defined as the usable space for the insertion of the virtual content in the generated augmented reality representation. The user is thus encouraged to stay in the activity space while viewing the augmented reality representation, to enjoy an optimal augmented reality experience. Thus, according to an embodiment, the user moving around within the activity space is alerted when a distance between said user and the virtual boundary is lower than a predetermined threshold. The alert may take the form of audio alarm, or of virtual cues warning displayed on the augmented reality representation. According to a particular feature, the augmented reality application is paused if the user ignores the warnings and breaks into the mixed space (and may be restored when the user moves back to the activity space).

Device

According to another aspect, the present disclosure also pertains to a device for generating an augmented representation of a real environment, called an augmented reality representation, wherein said device comprises at least one processor adapted and configured for:

obtaining, as a function of said real environment, a virtual boundary dividing said real environment into two spaces, respectively called an activity space and a mixed space;
  generating said augmented reality representation, comprising:
    obtaining a first part of said augmented reality representation, called an activity part, corresponding to a representation of at least one part of said activity space;
    obtaining a second part of said augmented reality representation, called a mixed part, corresponding to an augmented representation of at least one part of said mixed space, in which at least one virtual content is combined with said representation of at least one part of said mixed space.

Such a device can be especially adapted to implement the method for generating an augmented representation of a real environment described here above. It could of course comprise the different characteristics pertaining to the method according to an embodiment of the disclosure, which can be combined or taken separately. Thus, the characteristics and advantages of the device are the same as those of the method.

Figure 8:
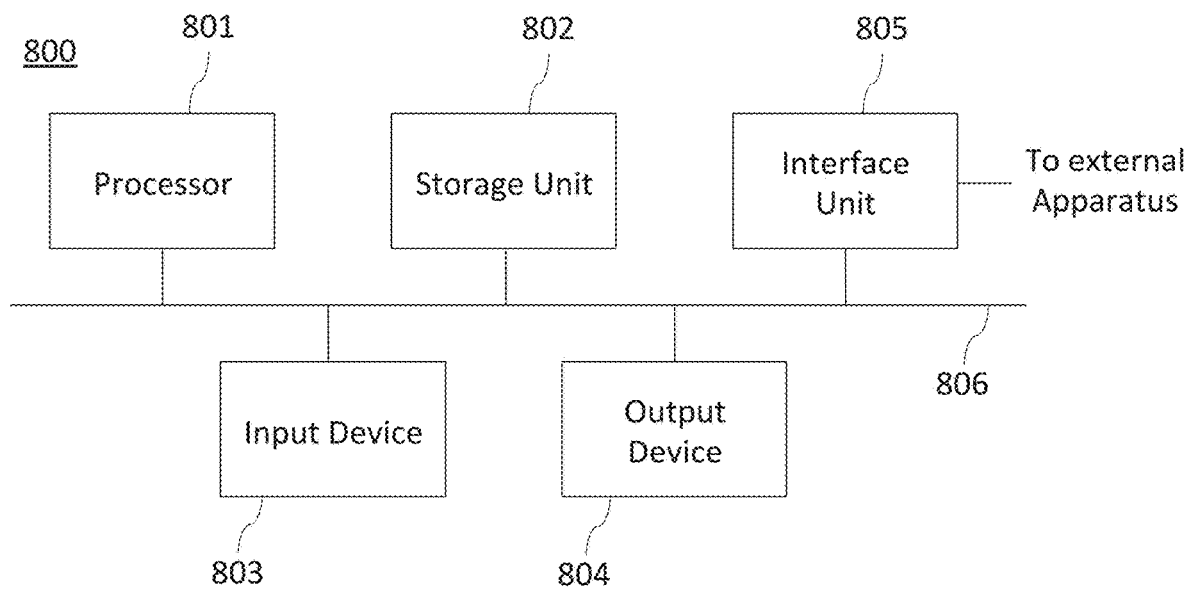
FIG. 8 is a schematic block diagram illustrating an example of an apparatus for generating an augmented representation of a real environment, according to an embodiment of the present disclosure.

FIG. 8 is a schematic block diagram illustrating an example of a device 800 for generating an augmented representation of a real environment according to an embodiment of the present disclosure. In an embodiment of the proposed technique, such a device may be embedded in an apparatus such as a head-mounted display, a mobile phone, or a tablet for example. In another embodiment, it may be an external device connected to or in communication with a rendering apparatus able to display an augmented reality representation to a user.

The device 800 includes a processor 801, a storage unit 802, an input device 803, an output device 804, and an interface unit 805 which are connected by a bus 806. Of course, constituent elements of the computer device 800 may be connected by a connection other than a bus connection using the bus 806.

The processor 801 controls operations of the device 800. The storage unit 802 stores at least one program to be executed by the processor 801, and various data, including for example data related to the user and data related to the real environment, parameters used by computations performed by the processor 801, intermediate data of computations performed by the processor 801, and so on. The processor 801 is formed by any known and suitable hardware, or software, or a combination of hardware and software. For example, the processor 801 is formed by dedicated hardware such as a processing circuit, or by a programmable processing unit such as a CPU (Central Processing Unit) that executes a program stored in a memory thereof.

The storage unit 802 is formed by any suitable storage or means capable of storing the program, data, or the like in a computer-readable manner. Examples of the storage unit 802 include non-transitory computer-readable storage media such as semiconductor memory devices, and magnetic, optical, or magneto-optical recording media loaded into a read and write unit. The program causes the processor 801 to perform a method for generating an augmented representation of a real environment according to an embodiment of the present disclosure as described previously. More particularly, the program causes the processor 801 to obtain, as a function of the real environment, a virtual boundary dividing said real environment into two spaces, respectively called an activity space and a mixed space and to take into account this space division when generating an augmented representation of the real environment.

The input device 803 is formed for example by one or several sensors allowing determining various data related to the user and various data related to the real environment.

The output device 804 is formed for example by a head-mounted display, a tablet display, or a mobile phone display to display the augmented reality representation generated by applying the method previously described.

The interface unit 805 provides an interface between the device 800 and an external apparatus. The interface unit 805 may be communicable with the external apparatus via cable or wireless communication. For example, in an embodiment where the device 800 is not embedded in a head-mounted display, a tablet or a mobile phone, an external apparatus may be respectively such a head-mounted display, tablet or mobile phone.

Although only one processor 801 is shown on FIG. 8, it must be understood that such a processor may comprise different modules and units embodying the functions carried out by device 800 according to embodiments of the present disclosure, for generating an augmented representation of a real environment, such as:

- a module for obtaining, as a function of said real environment, a virtual boundary dividing said real environment into two spaces, respectively called an activity space and a mixed space;
- a module for generating said augmented reality representation, comprising:
  - a module for obtaining a first part of said augmented reality representation, called an activity part, corresponding to a representation of at least one part of said activity space;
  - a module for obtaining a second part of said augmented reality representation, called a mixed part, corresponding to an augmented representation of at least one part of said mixed space, in which at least one virtual content is combined with said representation of at least one part of said mixed space.

The processor 801 may of course also comprise other modules allowing implementing the functions corresponding to the various other embodiments previously described in relation with the method for generating an augmented representation of a real environment.

These modules and units may also be embodied in several processors 801 communicating and co-operating with each other.

Computer Program Product and Non-Transitory Computer-Readable Medium

Another aspect of the present disclosure pertains to at least one computer program product downloadable from a communication network and/or recorded on a medium readable by a computer and/or executable by a processor, comprising program code instructions for implementing the method as described above.

In addition, the present disclosure also concerns a non-transitory computer-readable medium comprising a computer program product recorded thereon and capable of being run by a processor, including program code instructions for implementing the method for generating an augmented representation of a real environment as described above.

The computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for generating an augmented representation of a real environment comprising at least one real object, the method comprising:
   obtaining a virtual boundary as a function of data associated with the at least one real object of the real environment and as a function of a difference between a scale of the real environment and a scale of a default virtual scene comprising virtual content, the virtual boundary dividing the real environment into an activity space and a mixed space;
   generating the augmented representation comprising:
     obtaining a first part of the augmented representation corresponding to a representation of at least one part of the activity space being free of virtual content;
     obtaining a second part of the augmented representation corresponding to an augmented representation of at least one part of the mixed space, in which the virtual content is combined with a representation of at least one part of the mixed space.

2. The method according to claim 1, wherein the virtual boundary is obtained as a function of a shape of the at least one real object.

3. The method according to claim 1, wherein the at least one real object is a moving object, and wherein the virtual boundary is obtained dynamically as a function of the at least one moving real object.

4. The method according to claim 1, wherein obtaining the virtual boundary comprises obtaining the virtual boundary as a function of a category of the real environment.

5. The method according to claim 1, wherein the data associated with the at least one object comprise a position of a user of the augmented representation within the real environment.

6. The method according to claim 1, wherein the data associated with the at least one object comprises at least one of a current height and a current posture of a user of the augmented representation.

7. The method according to claim 1, wherein obtaining the second part of the augmented representation comprises scaling the at least one virtual content as a function of at least one difference between a size of the default virtual scene comprising the at least one virtual content and a size of the real environment in the mixed space.

8. The method according to claim 7, wherein the at least one virtual content is scaled as a function of a difference between a size of a virtual ground area of the default virtual scene and a size of a real ground area of the real environment in the mixed space.

9. The method according to claim 1, wherein at least one virtual content in the second part is obtained by taking account of a representation of the at least one real object in the first part.

10. The method according to claim 1, further comprising alerting a user of the augmented representation when a distance between the user and the virtual boundary is lower than a predetermined threshold.

11. A non-transitory computer-readable medium including program code instructions for generating an augmented representation of a real environment, wherein the program code instructions perform:
- obtaining a virtual boundary as a function of data associated with the at least one real object of the real environment and as a function of a difference between a scale of the real environment and a scale of a default virtual scene comprising virtual content, the virtual boundary dividing the real environment into an activity space and a mixed space;
- generating the augmented representation comprising:
  - obtaining a first part of the augmented representation corresponding to a representation of at least one part of the activity space and being free of virtual content;
  - obtaining a second part of the augmented representation corresponding to an augmented representation of at least one part of the mixed space, in which the virtual content is combined with a representation of at least one part of the mixed space.

12. A device for generating an augmented representation of a real environment comprising at least one real object, the device comprising at least one processor adapted and configured to:
- obtain a virtual boundary as a function of data associated with the at least one real object of the real environment and as a function of a difference between a scale of the real environment and a scale of a default virtual scene comprising virtual content, the virtual boundary dividing the real environment into an activity space and a mixed space;
- generate the augmented representation comprising:
  - obtaining a first part of the augmented representation corresponding to a representation of at least one part of the activity space and being free of virtual content;
  - obtaining a second part of the augmented representation corresponding to an augmented representation of at least one part of the mixed space, in which the virtual content is combined with the representation of at least one part of the mixed space.

13. The device according to claim 12, wherein the virtual boundary is obtained as a function of a shape of the at least one real object.

14. The device according to claim 12, wherein the at least one real object is a moving object, and wherein the virtual boundary is obtained dynamically as a function of the at least one moving real object.

15. The device according to claim 12, wherein obtaining the virtual boundary comprises obtaining the virtual boundary as a function of a category of the real environment.

16. The device according to claim 12, wherein the data associated with the at least one object comprise a position of a user of the augmented representation within the real environment.

17. The device according to claim 12, wherein the data associated with the at least one object comprises at least one of a current height and a current posture of a user of the augmented representation.

18. The device according to claim 12, wherein obtaining the second part of the augmented representation comprises scaling the at least one virtual content as a function of at least one difference between a size of the default virtual scene comprising the at least one virtual content and a size of the real environment in the mixed space.

19. The device according to claim 18, wherein the at least one virtual content is scaled as a function of a difference between a size of a virtual ground area of the default virtual scene and a size of a real ground area of the real environment in the mixed space.

20. The device according to claim 12, wherein at least one virtual content in the second part is obtained by taking account of a representation of the at least one real object in the first part.

21. The device according to claim 12, comprising an output device for alerting a user of the augmented representation when a distance between the user and the virtual boundary is lower than a predetermined threshold.

* * * * *